A. MARTINELLI.
SEDIMENT REMOVER.
APPLICATION FILED JULY 22, 1910.
982,734.
Patented Jan. 24, 1911.
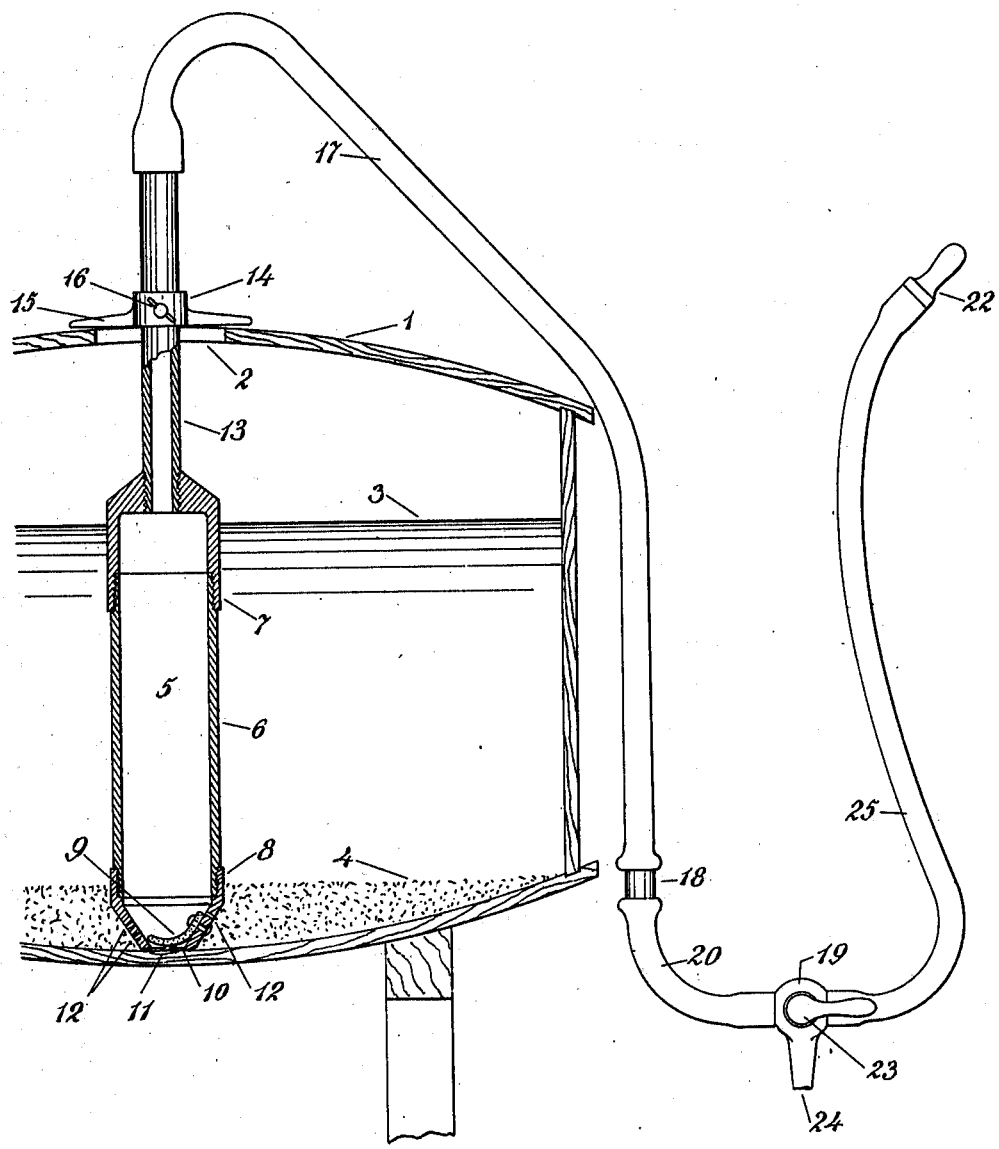
WITNESSES
INVENTOR

UNITED STATES PATENT OFFICE.

ARTURO MARTINELLI, OF WEST HOBOKEN, NEW JERSEY.

SEDIMENT-REMOVER.

982,734.  Specification of Letters Patent. Patented Jan. 24, 1911.

Application filed July 22, 1910. Serial No. 573,339.

*To all whom it may concern:*

Be it known that I, ARTURO MARTINELLI, a subject of the King of Italy, residing in the city of West Hoboken, county of Hudson, and State of New Jersey, have invented certain new and useful Improvements in Sediment-Removers; and I do hereby declare the following to be a full, clear, and exact description of the invention, such as will enable others skilled in the art to which it appertains to make and use the same, reference being had to the accompanying drawing, forming part of this specification, which is a sectional side elevation of the improvement as applied.

The object of this invention is to provide a simple and compact device for removing sediment and other matter accumulating on the bottom of barrels, tanks, wells, etc.

A further object of this invention is to provide a device which can be used as an ordinary siphon to extract liquids from barrels and the like in the usual manner.

The accompanying drawing shows a model of the device especially designed for removing sediment from barrels.

It is a well known fact that in the manufacture of wine it becomes often necessary to remove the liquid from the barrels and to filter it, in order to clean the same and the container of the sediment which has been formed. This operation is costly and cumbersome, and moreover the clearness and quality of the wine is likely to be damaged by such sediment which might still be held in suspension on account of the disturbed condition of the liquid during the operation.

My improved device enables the operator to remove the sediment without disturbing in the least the liquid itself, which condition, as stated, aside from the labor saving effected, is of prime importance in the manufacture of wine.

The invention consists principally of a suction pipe, provided at its lower end with an enlarged chamber and valve casing; and more particularly, referring to the drawing: 1 is a barrel, provided with a bunghole 2, containing a liquid 3; 4 is sediment which has collected at the bottom of the barrel, and which must be removed.

My improved device consists of a chamber 5, formed by a tubular piece 6, an upper end 7 and a lower end 8. Said lower end 8, when the device is used for removing the larger part of the sediment, will rest on the bottom of the barrel, as shown, and is provided with a suction valve 9 operating on a vale opening 10; the bottom of said end part or valve casing 8 is not perfectly flat, but is provided with bumps or projections 11 with the object of leaving some openings between the lower edge of part 8 and the bottom of the barrel to insure a free inlet and an easy operation of the device. Said part 8 is also provided with various small holes 12, whose object will be described later.

13 is a pipe of any suitable material, provided with a collar 14; this collar rests on the sides of the bung-hole by means of wings 15, so as to permit the air to freely enter the barrel, and is adjustable on pipe 13 in any position by means of a screw 16, its object being to permit the device to be raised or lowered in relation to the liquid.

17 is a hose of a rubber or any other suitable material, attached to the end of pipe 13, and forming, together with parts 18, 19, 20, 25, 22 a siphon operated in the usual manner. Part 18 is a piece of glass pipe which enables the operator to see when the material extracted reaches the bottom of the siphon; 19 is a faucet, preferably of wood, of the three way type, which can establish the communication between parts 20 and 21 of the siphon, or between part 20 and outlet 24 of the faucet, at the will of the operator; 20 and 25 are two pieces of hose completing the siphon, and 22 is a mouth piece for producing the suction.

The operation of the device is as follows: When it is desired to remove the sediment from the bottom of the barrel, chamber 5 is introduced into the same through the bunghole 2, and lowered, as shown, until it reaches the bottom of the barrel, or a trifle higher; plug 23 of the faucet 19 is set so as to form a continuous channel between parts 20 and 25, closing the outer 24: it is obvious that to insure the proper working of the siphon after being started, the lower part of it must be kept at a level inferior to that of mouth 10 of the valve casing. A suction is then produced with the mouth at the end 22 of the siphon, and sediment 4 will begin to flow into chamber 5 and then through pipes 13 and 17 will run down to the lower part of the siphon. When the operator sees the flowing material pass through glass pipe 18, he will turn plug 23 of faucet 19 so as to establish communication between part 20 and outlet 24: the sediment will then flow continuously from outlet 24. The speed of the material entering chamber 5 is slow enough not to disturb the liquid; by experience however, it is sufficient to draw all the sediment to the central part of the barrel, and then through the chamber, the inclination of the walls of the barrel helping to the same end. When the sediment is almost entirely removed it begins to flow mixed with liquid; at this stage, faucet 19 is closed, chamber 5 raised from the liquid, and the contents of the downward part of the siphon caused to flow back into chamber 5. From this the liquid part will escape through small holes 12 back into the barrel, while the sediment will remain in the chamber. By removing end 8, the chamber can be emptied of its contents; and this operation can be repeated several times, until all the sediment has been removed. The devices can now be operated as a siphon in the ordinary way, to extract the clean liquid from the barrel, if desired; should it be necessary however to extract clear liquid when the sediment has not yet been removed, by shifting collar 14 to a lower point on pipe 13, chamber 5 can be raised so that mouth 10 will be entirely out of the sediment, and only clear liquid will flow through the chamber and pipes.

The device, as shown, is constructed so as to be easily handled and cleaned, but it can be very materially changed in its details without departing from the spirit of the invention. Thus, parts 18, 19, 20, 25, 22 could be omitted, their functions being useful but not necessary, inasmuch as the siphon could be formed by a single piece of hose of a sufficient length and its outer end used for the flow of the liquid, as is usually done. The suction could be produced with a pump or any other suitable means when desirable or necessary, instead of being produced with the mouth. These and various other modifications and changes may be made in the details of construction, therefore I do not wish to confine myself to that shown and described.

Having thus described my invention, what I claim as new, and desire to secure by Letters Patent is:

1. A siphon comprising a chamber consisting of a cylindrical body, a top and a detachable valve casing at its lower end provided with an inwardly operating valve and with small perforations for the straining of the liquid contained in said chamber, in combination with a suction pipe of a diameter smaller than said chamber, connected to said top, having a section made of a transparent material, and a three way faucet, as described.

2. A siphon comprising a chamber consisting of a cylindrical body, a top and a detachable valve casing at its lower end provided with an inwardly operating valve and with small perforations for the straining of the liquid contained in said chamber, in combination with a suction pipe of a diameter smaller than said chamber, connected to said top, having a section made of a transparent material, a three way faucet, and adjustable means for holding the device in a vessel at different levels, as described.

ARTURO MARTINELLI.

Witnesses:
 GUIDO SACERDOTE,
 ONIDE SCACCHETTI.